(12) United States Patent
Fontaine

(10) Patent No.: US 6,585,458 B1
(45) Date of Patent: Jul. 1, 2003

(54) FILE ADAPTER FOR POWER SAW TOOL

(75) Inventor: Robert R. Fontaine, Pacoima, CA (US)

(73) Assignee: Filezall, Inc., Los Angeles, CA (US)

( * ) Notice: Subject to any disclaimer, the term of this patent is extended or adjusted under 35 U.S.C. 154(b) by 18 days.

(21) Appl. No.: 09/659,518

(22) Filed: Sep. 12, 2000

Related U.S. Application Data

(63) Continuation-in-part of application No. 09/294,733, filed on Apr. 19, 1999, now Pat. No. 6,142,715.

(51) Int. Cl.$^7$ .......................... B23D 71/00; B23D 71/04
(52) U.S. Cl. ................ 407/29.1; 407/29.11; 407/29.15; 29/76.1
(58) Field of Search ............. 407/29.1, 29.11, 407/29.12, 29.14, 29.15; 29/76.1

(56) References Cited

U.S. PATENT DOCUMENTS

| 79,709 | A | * | 7/1868 | Weare | 407/29.15 |
| 341,664 | A | * | 5/1886 | Krayer | 29/76.1 |
| 2,186,997 | A | * | 1/1940 | Stark | 29/76.1 |
| 2,962,798 | A | * | 12/1960 | Gaskins | 407/29.15 X |
| 4,594,919 | A | * | 6/1986 | Southard | 407/29.15 X |
| 5,097,578 | A | * | 3/1992 | Jandl | 407/29.1 |

* cited by examiner

Primary Examiner—Henry W. H. Tsai
(74) Attorney, Agent, or Firm—Christie, Parker & Hale, LLP

(57) ABSTRACT

A file adapter for a motor driven workpiece cutting tool comprises a power head reciprocating an elongate file coupled to a ram-rod reciprocated thereby on a forwardly projecting axis. The adapter includes a forwardly extending member carried by the power head of the tool and positioning a resistance means for engaging and downwardly pressing the top face of the file forwardly of its coupled engagement to the ramrod. The file is a second class lever with its fulcrum coupled to the ram-rod and its resistance pressured at said resistance means when its cutting means forcibly engage a workpiece. The resistance means preferably comprises a roller on a transverse axis spaced above said forwardly projecting axis and with a periphery thereof engaging and downwardly pressuring the file.

9 Claims, 9 Drawing Sheets

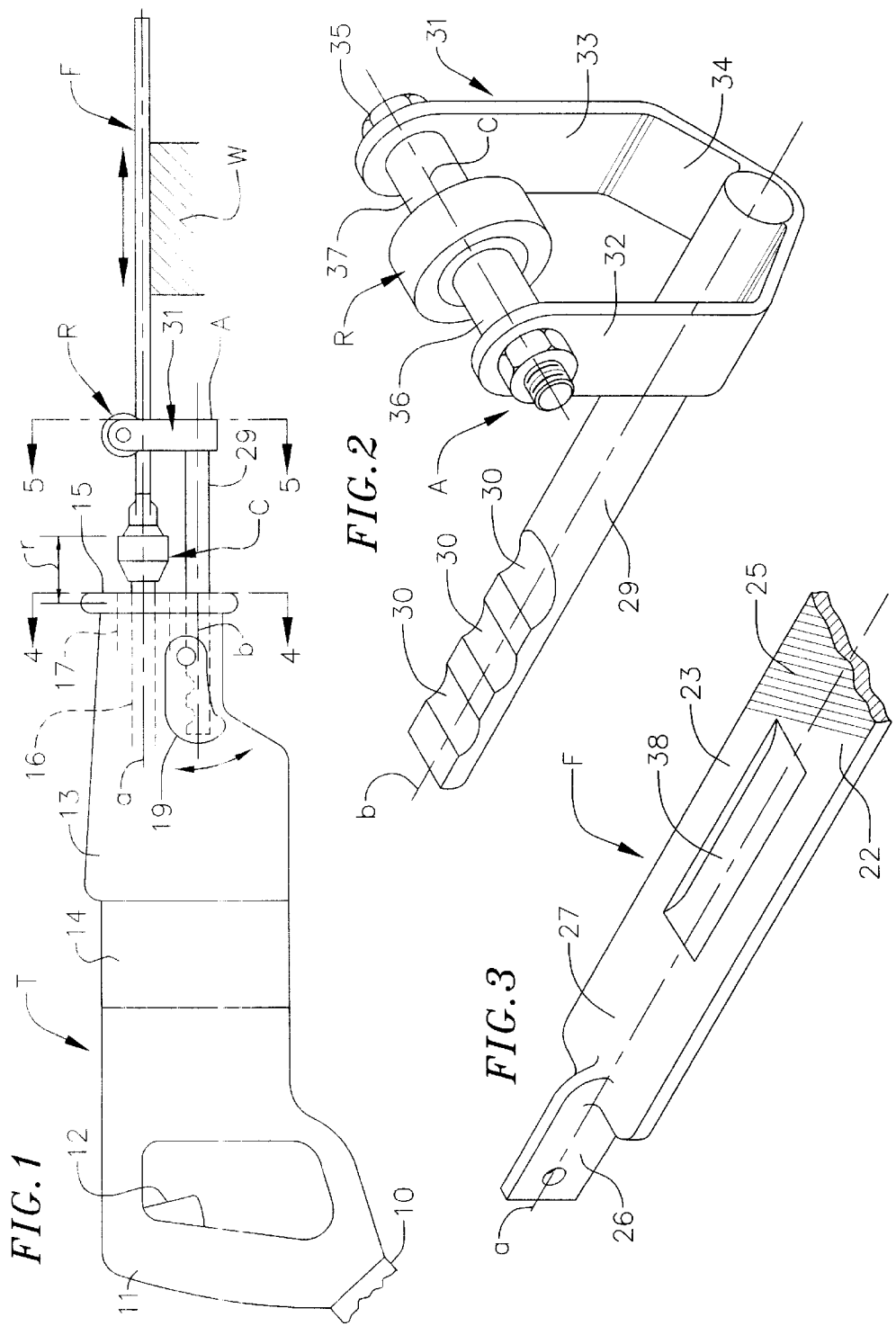

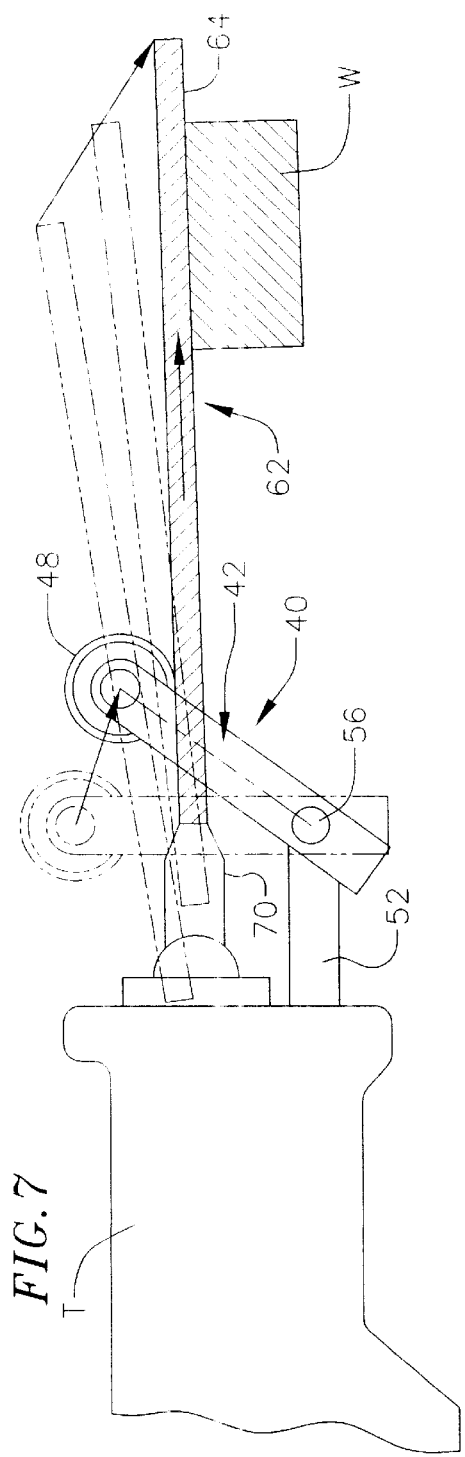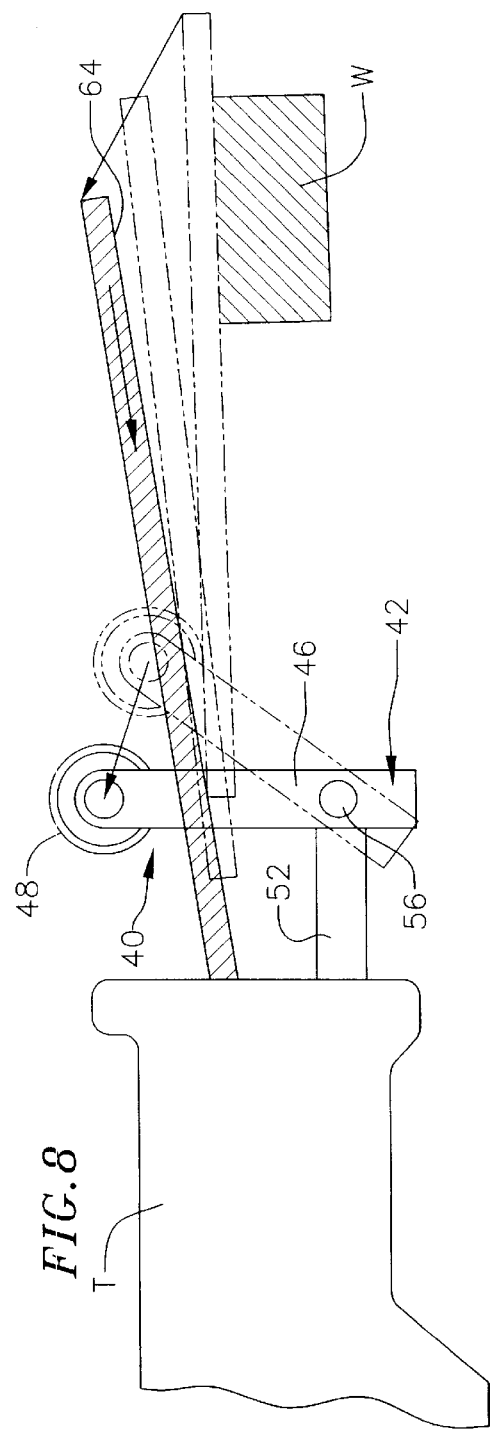

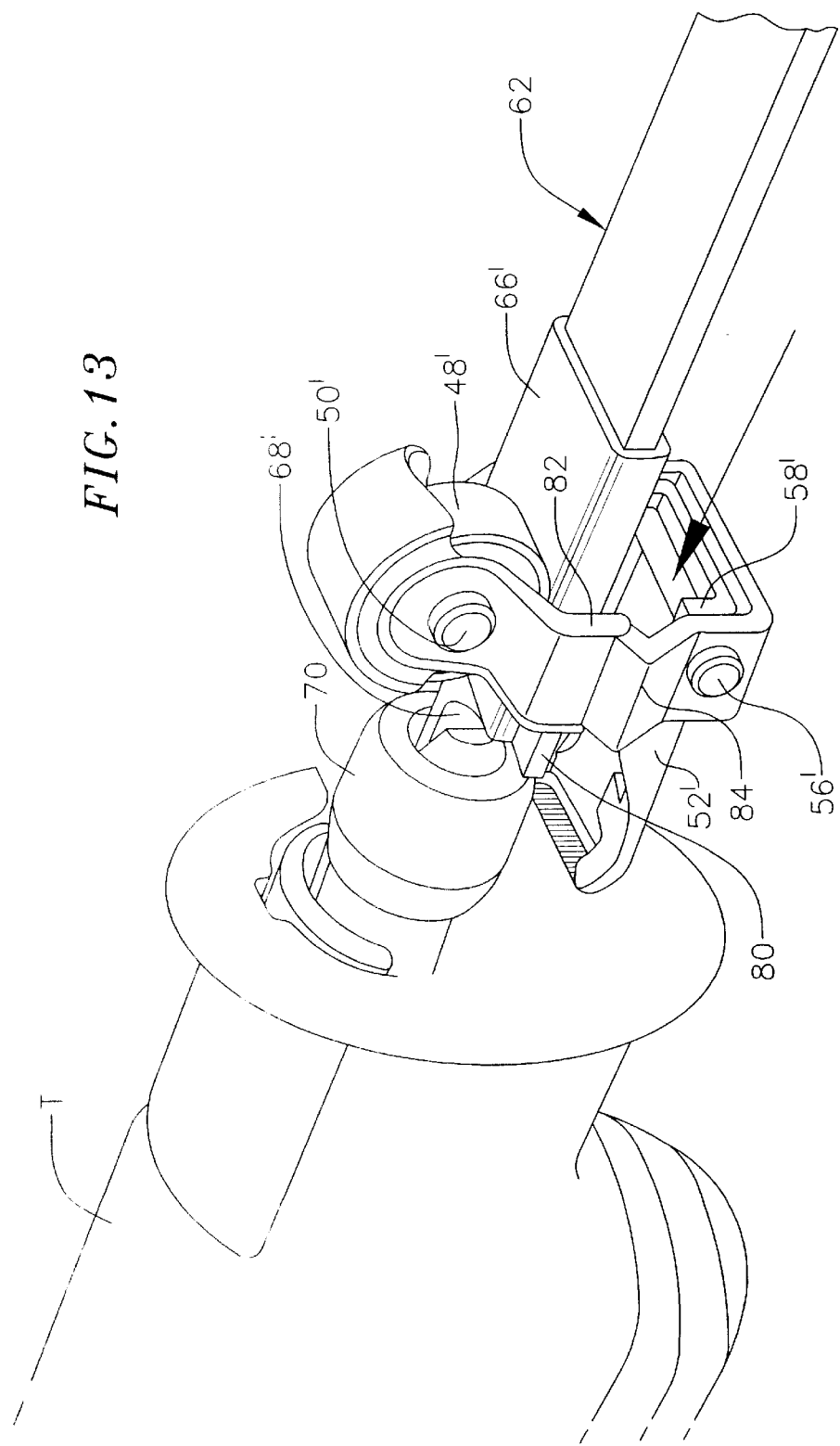

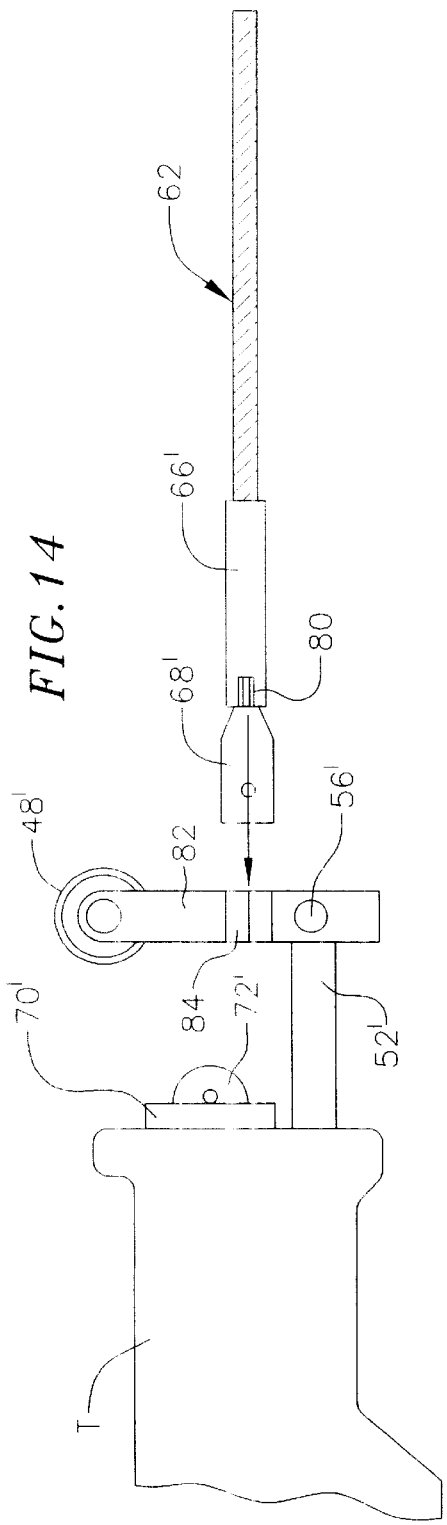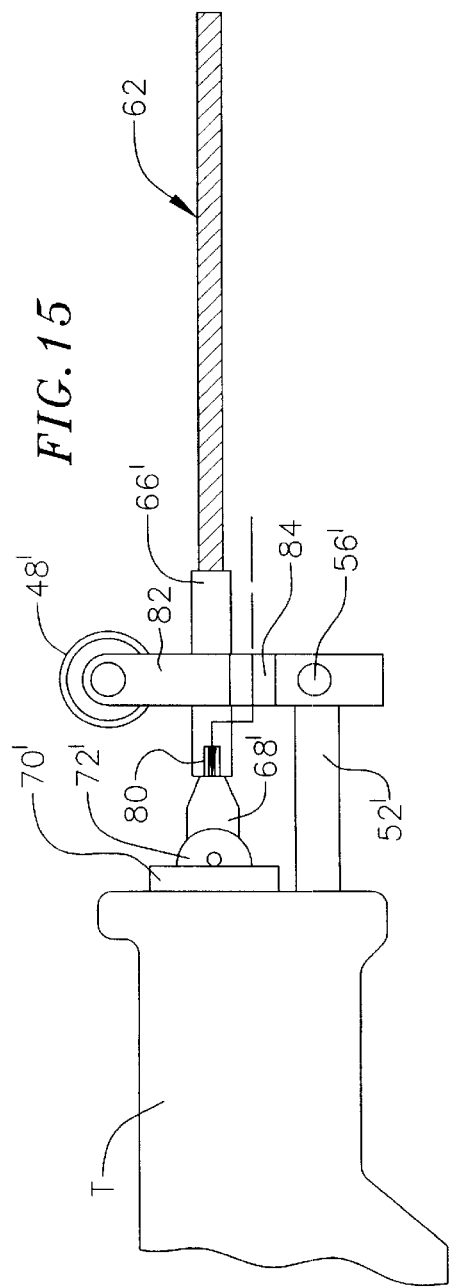

FILE ADAPTER FOR POWER SAW TOOL

CROSS-REFERENCE TO RELATED APPLICATION

This is a continuation-in-part of application Ser. No. 09/294,733, filed Apr. 19, 1999 now U.S. Pat. No. 6,142,715.

BACKGROUND OF THE INVENTION

This invention relates to hand operated power tools of the type for reciprocating saw blades and the like. Such tools are electrically operated and characterized by a driving head that reciprocates a ram rod to which a saw blade or the like is attached as by means of a set screw or chuck. A feature of these power saw tools is a shoe that slidably engages and limits the penetration of the saw blade into the workpiece. A heavy duty power saw tool of the type under consideration is shown in FIG. 1 of the drawings herein, with the aforesaid guide shoe removed and replaced by the file adapter of the present invention. Also, a common hand file (modified) replaces a saw blade for which this particular power tool is designed.

Heretofore, slender elongated saw blades of thin cross section (0.040" to 0.050"), and sander attachments, have been operated by such power tools, so as to reciprocate against and through the workpiece. Various guide mechanisms have been associated with the controlling shoe to back up the saw blade as it is pressed against the workpiece. A characteristic of these power saw tools is the relatively short stroke of the saw blade which too is relatively short and not as lengthy as a hand saw would be. In other words, the power tools of the prior art have not been conducive to the adaption thereto of lengthy hand files.

It is the common hand file with which this invention is particularly concerned, and it is to be understood that there are various special files to which the adapter system of the present invention is to be applied. The files with which this invention is concerned are elongated bars with a surface upon which teeth are formed to engage and cut material from a workpiece. The cross sectional configuration of these bars varies in order to present a toothed surface, and the coarseness and number of teeth is as circumstances require. For example, files can be flat, round, half-round, triangular or rectangular, and the tooth configuration coarse cut, bastard cut, single cut, double cut, etc. There are also rasp files with an arrangement of round cupped teeth. It is to be understood, therefore, that this invention relates to all files, a characteristic of which is a body of hardened steel having a base end with an annealed tang of tapered configuration extending from a base end thereof. A full sized common file has an active toothed face which can be nine inches long and seven-eighths inch wide, with a base and tang approximately three inches long extending therefrom (these dimensions are variable). It is this common hand file with which this invention is particularly concerned, and an objective of this invention to modify such a file and thereby adapt it to a chuck of a power saw tool.

Hand filing involves manipulative skills. That is, the teeth are formed so as to cut only during a forward pushing motion during which downward pressure against the workpiece must be applied. Too little pressure especially on hard materials tends to dull the teeth quickly. And too much pressure tends to clog the teeth and break them off. Accordingly, pressure against the workpiece must be applied in order to render a file effective. It is to this end that an object of this invention is to provide a power saw tool adapter for applying work pressure to the back side of a file coupled to the reciprocating chuck portion of the tool. In accordance with this invention, the work pressure is applied to the base-tang end portion of the file, the work pressure being shared by the chuck and ram-rod of the power tool.

In the course of rough shaping a workpiece with the power saw tool file adapter of this invention, lateral pressures are applied to the file that is anchored to the reciprocating chuck of the tool. In practice, the active toothed portion of the file extends four or five times its base length, forming a lever arm that could destroy the coupled attachment of the file to the tool chuck. One objective of this invention is to eliminate bending stress from the file-to-chuck connection, by means of a fixedly positioned guide roller operating as a resistance member in a guideway formed in the back side of the file base.

One embodiment of this invention provides a file adapter that replaces the prior art shoe of power saw tools. The adapter provides (1) a resistance for the application of downward work pressure, and (2) a double resistance for side to side reception to lateral work pressures; all of which prevents destructive forces from being applied to the file-to-chuck connection. Accordingly, a second class lever is involved in any situation, the chuck of the power tool being the fulcrum, the guide roller being the resistance, and the extended file being the forceful lever arm.

As mentioned, the teeth on a file are designed to cut only in a forward pushing motion against the workpiece. Dragging the file across the workpiece in a reverse direction can dull the teeth. One embodiment of the invention provides a file adapter that prevents dragging the file backwards across the workpiece during each reverse stroke of the reciprocating file.

Since the file is reciprocated forcefully at high speed by the power tool, there is a need to ensure that the file is not ejected from the adapter if the file-to-chuck attachment becomes loosened or the file breaks, for example. One embodiment of the adapter provides a safety feature that prevents the file from being ejected under these circumstances.

PRIOR ART

This file adapter system for electrical power tools is especially suited for incorporation in a "SAWZALL" power operated saw manufactured by Milwaukee Tool Corp. and disclosed in U.S. Pat. No. 5,855,070 issued Jan. 5, 1999. ("SAWZALL" is a registered trademark of Milwaukee Tool Corp.) The file adapter of this invention replaces the pivotally attached shoe thereof in order to operate a file in place of a saw. The Milwaukee '070 patent power tool features the adjustable shoe that pivotally engages the workpiece, whereas the present invention adapter does not engage the workpiece but rather engages and controls the work cutter in the form of a file. The Milwaukee '070 patent power tool is a heavy duty tool used generally in a horizontal position and manipulated into any other convenient position, and is characterized by its longitudinally disposed reciprocal axis, there being a motor and drive head intermediate a hand grip and functional working end. The work engagement shoe is essentially an attachment and there is an adjustable lock to receive the shoe attachment at three extended positions. A feature of the Milwaukee '070 power tool is the two-jaw chuck for coupling the flat faced end portion of a saw blade or the like to the operational end of the reciprocating ram-rod. The ram-rod is rotatably guided so as to maintain the flat base of the saw blade in a vertical plane coincidental with the reciprocal axis. The saw blade cantilevers from the chuck when coupled thereto.

SUMMARY OF THE INVENTION

Briefly, the file adapter of this invention enables a file to cantilever from the aforesaid power saw tool chuck without subjecting the coupled attachment to damaging bending stresses. The file-to-chuck attachment is essentially a hinge and therefore bending moments can be critically high. However, by restricting the file-to-chuck attachment so as to function as the fulcrum of a second class lever, bending stresses are virtually eliminated, since the function of the resistance roller herein provided prevents upward and side movement of the file at a position substantially removed from the fulcrum. In practice the fulcrum shifts approximately 2.25 inch and 3.50 inch from the resistance roller as a result of reciprocal motion. This provides a variable lever that is sufficient to withstand the downward and lateral operational loads normally applied.

In carrying out one embodiment of this invention, the annealed base and tongue portion of the file is modified, as by forging a vertically disposed coupling plate thereof, or by integrally fastening such a plate to the base of the file. A feature of the file modification is a roller guideway in the face thereof opposite the cutting face of the file. In practice, a small portion of the cutting face may be sacrificed to accommodate the roller guideway, at either or both sides of the file.

The file adapter employs the support and locking adjustment of the Milwaukee '070 patent power tool and provides a fixedly placed resistance roller support overlying the base portion of the file to engage in the roller guideway therein.

In another embodiment of the invention, the file adapter includes a hinged bracket which allows the resistance contact with the file to shift back and forth during the file's reciprocating motion. This hinged adapter releases a downward force on the file during each return stroke of the reciprocating file to prevent dragging the file backwards across the workpiece, thereby preventing undue wear.

Another embodiment of the invention provides a safety feature that prevents the file from being ejected from the adapter if the file is dislodged from the file-to-chuck attachment, or if the file breaks. In this embodiment a specially designed file having protruding stops is inserted through a widened portion of the adapter and then locked in the chuck adjacent a different narrowed region of the adapter in alignment with the operative position of the file. During use, if the file is dislodged during its reciprocating motion, the stops on the file engage the narrowed portion of the adapter which captures the file inside the adapter to prevent ejecting it from the power tool.

The foregoing and various other objects and features of this invention will be more fully understood from the following detailed description and the accompanying drawings.

BRIEF DESCRIPTION OF THE DRAWINGS

FIG. 1 is a side elevational view of a power saw tool modified with one embodiment of the file adapter of the present invention and with a modified hand file coupled to the operating ram-rod of the tool.

FIG. 2 is an enlarged detailed perspective view of the file adapter shown in FIG. 1 in which the adapter is removed from the power tool of FIG. 1.

FIG. 3 is an enlarged fragmentary perspective view of a modified hand file for coupled engagement in the power tool chuck of FIG. 1.

FIG. 7 is semi-schematic side elevational view illustrating operation of the file adapter of FIG. 6 in a forward stroke of the file.

FIG. 8 is a semi-schematic side elevational view of the file adapter of FIG. 7 in operation during a return stroke of the file in which the motion of the file is exaggerated for clarity.

FIG. 13 is a fragmentary perspective view showing the file and file adapter of FIG. 12 assembled together and attached to a power tool.

FIG. 14 is a semi-schematic side elevational view showing the file/adapter safety feature in which the file is aligned with the adapter prior to connecting the file to the power tool.

FIG. 15 is a semi-schematic side elevational view similar to FIG. 14 in which the file/adapter safety feature is illustrated with the file and adapter connected to the power tool.

DETAILED DESCRIPTION OF THE PREFERRED EMBODIMENTS

Figure 4:
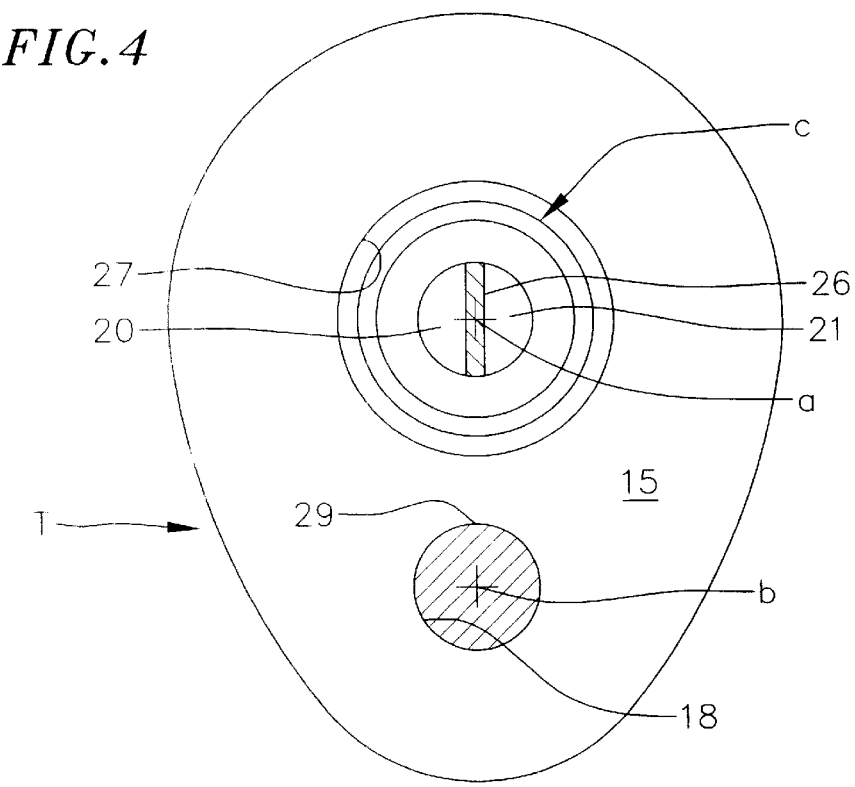
FIG. 4 is an enlarged detailed sectional view taken on line 4—4 of FIG. 1.

Referring to the drawings, FIG. 1 illustrates one embodiment of a file adapter A according to principles of this invention. The file adapter A is useful as an aftermarket attachment to a hand held power saw tool T illustrated in FIG. 1. However, it is to be understood that the features involved in this combination of power tool and file adapter can be a "Power File Tool" per se; and, the file F is a modified hand file as illustrated in FIG. 3. This file can be a special file with abrasive cutting means adapted to use in the Power File Tool.

The power saw tool T is electrically operated through a power cord attachment 10 and a hand grip 11 with a trigger switch 12 for controlled manipulation. Intermediate the hand grip 11 and a power head 13 there is an electric motor drive 14. The power head 13 is characterized by a flat front face 15 through which a ram-rod 16 reciprocates a chuck C on a reciprocating axis a. The chuck C is shown in its extreme forward reciprocal position, and its rearward travel is indicated by the dimension r. There is a chuck socket 17 in the face 15, so that the chuck is received in the power head 13 when retracted (not shown). A feature of the power saw tool T is the mounting bar socket 18 (FIG. 4) in the face 15, on an axis b spaced below and parallel to the reciprocating axis a of the tool. A latch means 19 located at one side of the power head 13 locks the mounting bar of the file adapter in working position as shown. There is no modification of the power saw tool T, although it can be made as a power filing tool per se.

Coupling of the file F to the operating exposed end of the ram-rod 16 can vary with power tools of different manufacture. In many reciprocating power saw tools a simple pin or screw fastener passes through the flat base portion of the saw blade, the pin or screw being subjected to shear forces. However, in the advanced tool design under consideration, the chuck C grips the flat base portion of the saw blade between a pair of jaws 20 and 21 which comprise a two-jaw chuck C as shown herein. Accordingly, the opposed gripping faces of the jaws 20 and 21 are perpendicularly disposed and spaced to receive a flat base of a file F as later described. The ram-rod 16 reciprocates but does not rotate on the reciprocating axis a, so that the jaw aperture of the chuck C remains perpendicular as shown. Additionally, the chuck jaws 20 and 21 can include shear pins to engage through the flat base of a file F (not shown).

Referring to FIG. 3 and to the modified or special file configuration of the illustrated embodiment, a file "blank" or body 22 of rectangular (or any other) cross section is shown wherein top and bottom faces 23 and 24 (FIG. 5) are spaced apart and parallel to each other and provided with cutting teeth 25, for example a "single cut bastard" file, as shown. In accordance with this invention, there is no "tang" and in place thereof there is a coupling plate 26 integral with the base portion 27 of the file "blank" or body 22. The file "blank" or body 22 has a longitudinal axis a equidistant from the faces 22 and 23 and from the opposite side edges of the file. The coupling plate 26 is centered on said axis and disposed perpendicular to the top and bottom faces 23 and 24. A shear pin opening 28 through the coupling plate 26 is aligned with the file axis a. The coupling plate is preferably formed as by forging from the annealed "tang" or base portion of the file "blank" or body 22; or it can be a separate member attached to the file body.

Referring to FIG. 2 and to the file adapter A, a forwardly extending member (describe below) is affixed to a elongated mounting bar 29 adapted to be received in the mounting bar socket 18 provided in the power saw tool face 15. The mounting bar 29 is locked in one of a plurality of adjustably extended positions by the latch means 19 engageable in a selected notch 30 spaced 30 along the bar. In practice, the mounting bar 29 has a flat face in which the notches are formed and engageable by the latch means 19 to rotatably fix the mounting bar when it is positioned.

Figure 5:
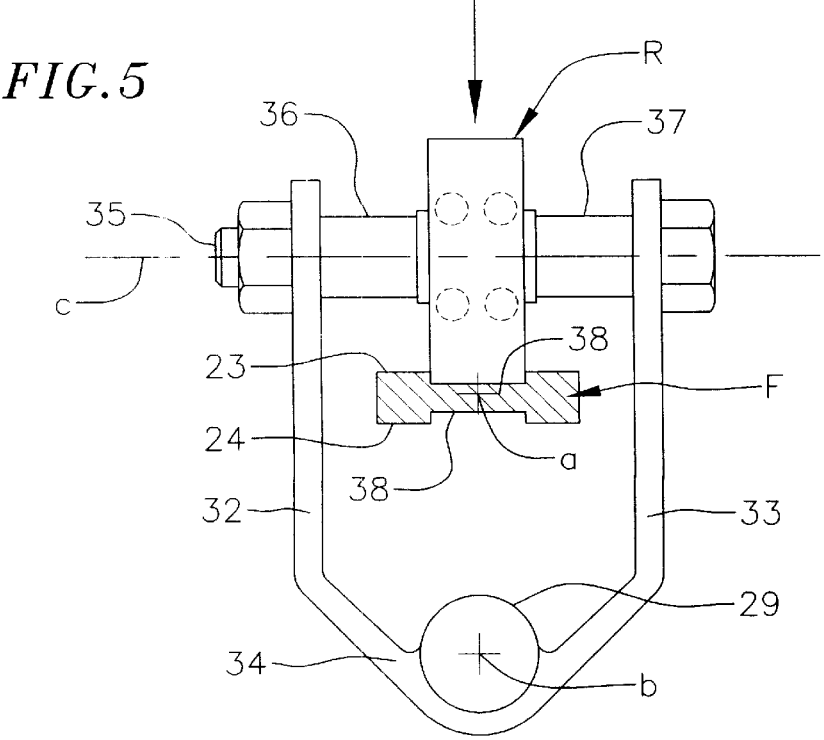
FIG. 5 is an enlarged detailed sectional view taken on line 5—5 on FIG. 1.

In accordance with one embodiment of this invention, a resistance means or roller R is fixedly positioned to downwardly pressure the extended file F when coupled to the ram-rod 16. This downward pressure is applied by means of the aforementioned forwardly extending member, preferably in the form of an upwardly opening, generally u-shaped bracket 31 carried on an end of the above described mounting bar 29. As best illustrated in FIG. 5 the bracket 31 embraces the reciprocating file F and supports the resistance roller R on a transverse axis c spaced above the file's top face 23 (or 24 since the file is reversible). The bracket 31 comprises spaced apart upstanding legs 32 and 33 carried by a saddle 34 welded or otherwise secured to the extended end portion of the mounting bar 29. A cap screw 35 secured by a nut extends through the legs 32 and 33, with spacer sleeves 36 and 37 fixing the inner race of a double ball bearing roller R centered over the reciprocal axis of the file F. The periphery of the resistance roller R is adapted to engage with the base of the file "blank" or body 22 (see FIGS.1 and 5).

Accordingly, downward pressure can be selectively applied at the resistance point of the second class lever with its fulcrum at the chuck C and force applied through downward pressure on the file against a workpiece W.

Referring to FIGS. 3 and 5 and to the modified (specialized) file F, lateral forces as may be applied are accepted by a groove or channel 38 on each face of the file, for preventing lateral displacement of the reciprocating file F. The same second class lever function as herein above described applies to the lateral resistance of the resistance roller R operating between the side walls of a groove or channel 38 as shown. The resistance roller R is received in the elongated resistance groove or channel 38, with minimum side wall clearance, whereby side motion is prevented at the roller R spaced from the fulcrum of attachment at the chuck C.

By employing the file adapter A and file modification hereinabove described, the file F coupled to the reciprocating chuck C becomes a second class lever positioned by the resistance roller R and with its fulcrum at the chuck. The force is applied to the workpiece W by the extended arm of the file lever. It is significant that the chuck C fulcrum is essentially fixed whereas the resistance roller R is essentially movable as it is employed to manually apply downward pressure to the file F, whereby the extended lever arm thereof forcibly applies the file teeth against the workpiece W. Accordingly, the coupled engagement of the file F to the chuck C is not subjected bending and is thereby protected against structural failure.

FIGS. 6 through 10 illustrate a further embodiment of the invention in which a file adapter 40 causes an elliptical motion at the working end of the file so that wear on the file teeth is prevented during reverse strokes of the reciprocating file. The adapter 40 can be used with various designs of power saw tools. During use the power tool T reciprocates the file at high frequency. In one embodiment, the file can be reciprocated at a rate of 2,800 stroke per/min. This is by way of example only, since in a given tool, the reciprocating rate of travel can vary and also can be adjustable. When the file is pressed against a workpiece, and if the file is reciprocated only on a fixed linear axis, the return strokes of the file can drag the file across the workpiece. This backwards motion can cause considerable wear to the teeth. Referring to the illustrated embodiment, the file adapter 40 comprises an upwardly opening generally U-shaped bracket 42. A roller bearing 44, similar to the roller R described previously, is rotatably mounted between upper ends of upright arms 46 and 48 spaced apart on opposite sides of the bracket 42. The roller bearing 48 is mounted for rotation on a cap screw 50 aligned on a transverse axis similar to the roller bearing R of FIGS. 1 through 5. An elongated shoe 52 is pivotally secured to a lower saddle portion of the bracket. The shoe is used to releasably lock the bracket 42 in a locking mechanism 54 similar to the previously described locking mechanism of the power tool. The configuration of the shoe can be varied depending upon the particular design of the locking mechanism in the power tool. The shoe 52 pivots to the lower transverse saddle portion of the bracket via a pivot pin 56 which extends through aligned openings in wall portions 58 at a front end of the shoe. In the illustrated embodiment, the front portion of the shoe is U-shaped and is disposed inside a corresponding U-shaped lower saddle portion of the bracket. The pivot pin 56 extends through the lower wall portions of the bracket and through the cooperating wall portions of the shoe. Thus, the lower portion of the bracket is rotatable about a transverse axis through the pivot pin 56 at the front end of the shoe 52.

The adapter also includes a hard plastic rounded shield 60 which covers a top portion of the roller 44. The shield is affixed to the top arms of the bracket via the cap screw 50 and is mounted to not rotate while the roller is free to rotate inside the shield. The arms on opposite sides of the bracket have surfaces made of hard plastic. Preferably, the shield and the arms of the bracket are made of nylon. The roller is made of steel as is the shoe portion of the adapter which releasably connects to the locking mechanism in the power tool.

Figure 6:
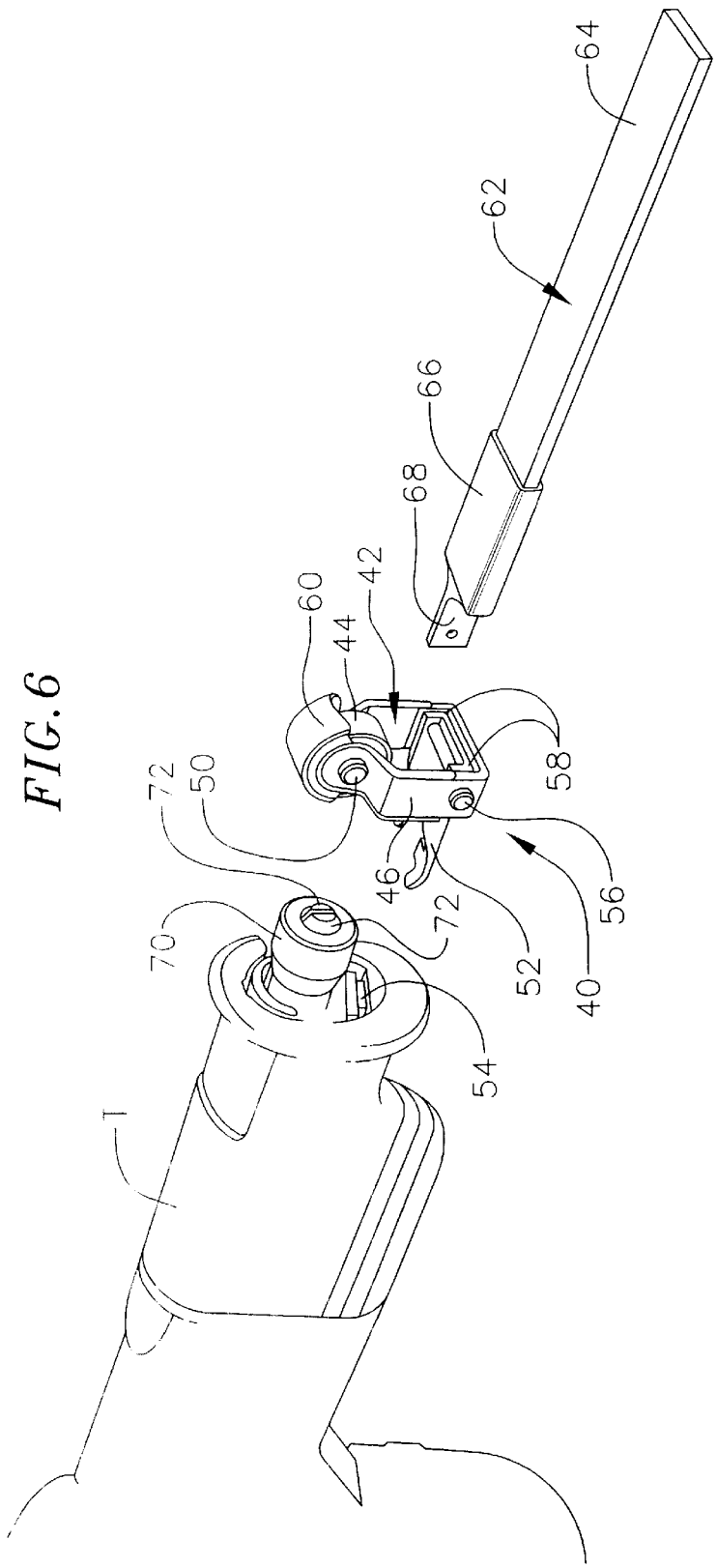
FIG. 6 is a fragmentary exploded perspective view showing an alternative embodiment of a file adapter aligned with a modified file and a power tool.

FIG. 6 best illustrates an embodiment of a file 62 which can be used with the embodiment illustrated in FIGS. 6 through 10. The file is similar to the file F described previously, having teeth 64 at a working end of the file. In this embodiment the previously described recessed regions (resistance means 38) of the file are replaced with an elongated hard plastic sleeve 66 at the end of the file adjacent the vertically disposed coupling plate 68. The sleeve is of rectangular tubular configuration and fits tightly on the end of the file with flat top and bottom surfaces protruding above the flat top and bottom surfaces of the file. During use, the bottom of the roller 48 contacts the top surface of the plastic sleeve 66 during each forward stroke of the reciprocating file. The plastic material reduces friction between the roller and file, and any contact between the plastic sleeve and the plastic arms of the bracket during use also reduces wear.

FIGS. 7 through 10 best illustrate use of the adapter 40. The flat coupling plate 68 of the file is inserted into the chuck 70 with the opposite faces of the jaws 72 of the chuck clamped to the coupling plate. This attachment is similar to that described above for the adapter of FIGS. 1 through 5 which fastens the file in a working position attached to the reciprocating ram-rod contained in the power tool.

FIGS. 7 and 8 show how the adapter bracket 42 can rotate between an angular position(FIG. 7) in which the roller maintains pressure contact with the top surface of the file during each forward stroke of the file, and an upright position (FIG. 8) in which the roller is released from pressure contact with the file during each return stroke of the file. The distance between the pivot pin 56 and the bottom of the roller is lengthened compared to the arrangement shown in the adapter of FIGS. 1 through 5. This extended distance facilitates the angular range of motion of the adapter compared to the fixed upright alignment of the bracket in the previous embodiment.

Operation of the adapter 40 during use is best understood by first referring to FIG. 7 which illustrates the forward stroke of the reciprocating file. During the forward stroke, the bracket 42 pivots forward, maintaining rolling contact between the bottom of the roller and the top surface of the file. (The roller contact is with the top surface of the sleeve 66.) The function of the reciprocating file during the forward stroke is similar to that previously described for the adapter in that the roller pushes down on the file on the forward stroke as the file teeth cut into the workpiece W. The rolling contact minimizes bending moments at the fulcrum (where the file is engaged with the chuck), and operation of the file becomes a second class lever.

FIG. 8 illustrates motion of the file during the reverse stroke of the reciprocating ram-rod. During use, the adapter allows the reciprocating file to pivot upwardly away from the workpiece during each return stroke of the file. This releases contact between the file and the workpiece and prevents the file from dragging across the surface of the workpiece during each return stroke, thereby reducing wear on the file. The power tool internally contains a mechanism which allows the chuck and its related file-holding device to pivot through a shallow angle about a transverse axis through the tool. This angular freedom of motion allows the file to pivot through a shallow angle (exaggerated in size in the drawings). This range of angular motion is illustrated in FIG. 8. In addition, since the distance between the roller and the pivot point at 56 has been lengthened, the bottom of the roller moves to a position spaced from the top surface of the file when the adapter bracket 42 pivots back to the upright position illustrated in FIG. 8. This spacing accommodates angular upward movement of the file at the workpiece as illustrated in FIG. B. (As mentioned, the motion illustrated in the drawings is exaggerated.) In practice, the spacing between the bottom of the roller and the top of the file (in the upright position of the bracket shown in FIG. 8) is about $\frac{1}{16}$ inch, in one embodiment.

Figure 9:
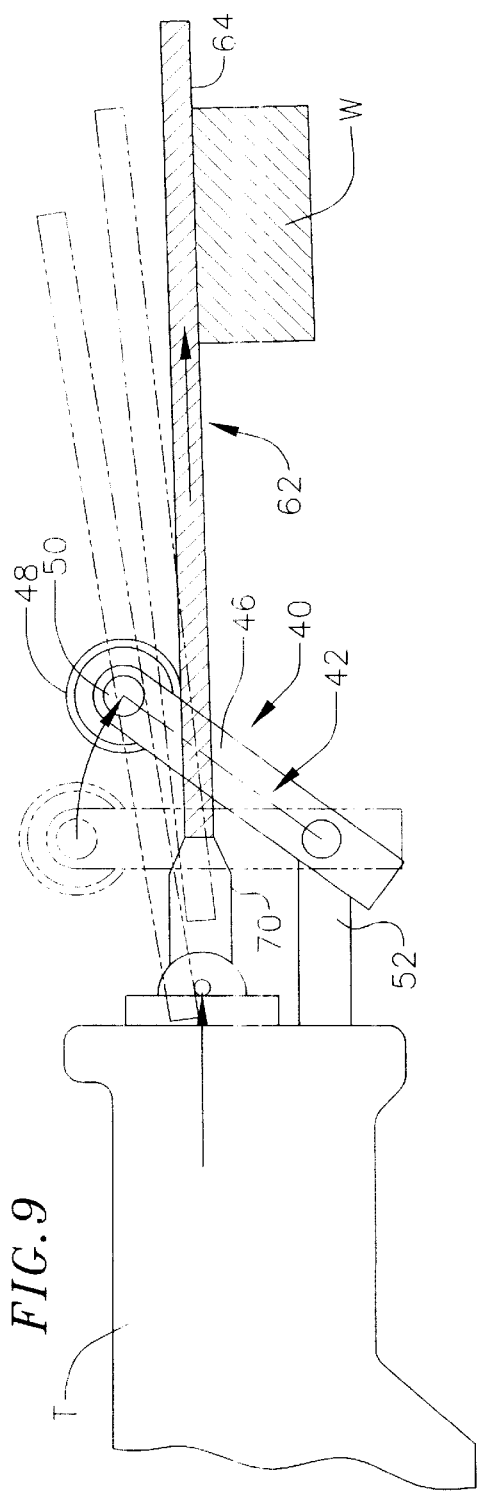
FIG. 9 is a semi-schematic side elevational view similar to FIG. 7 showing the file during a forward stroke and illustrating the range of motion of the file.
Figure 10:
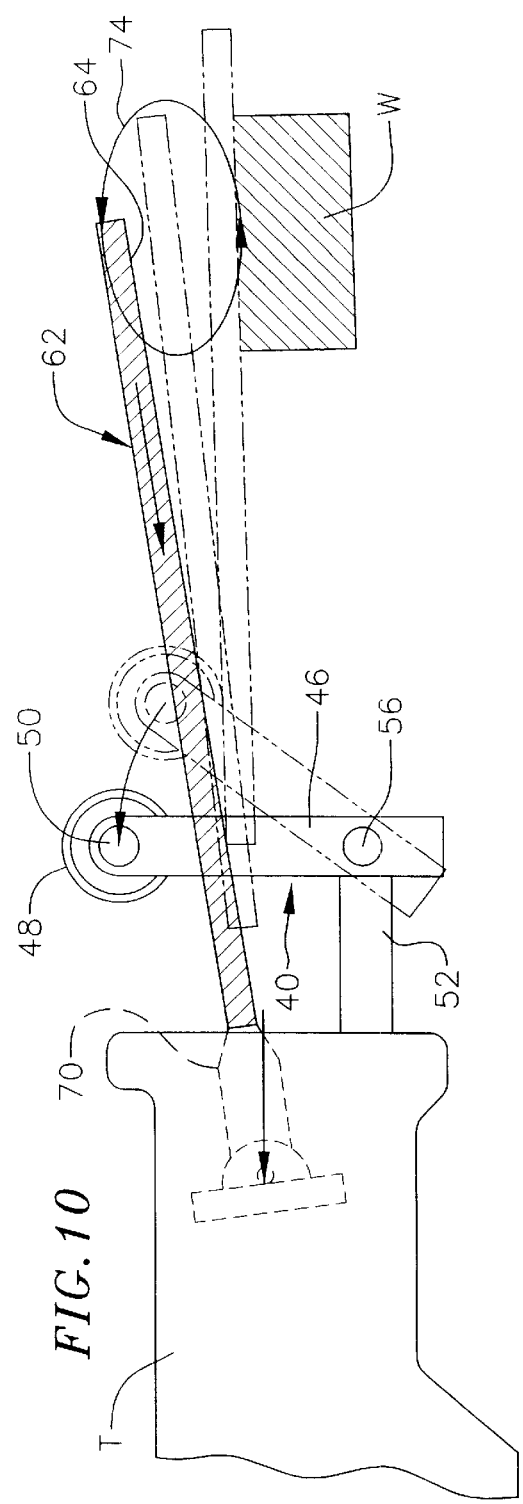
FIG. 10 is a semi-schematic side elevational view similar to FIG. 8 showing the file during a return stroke and illustrating an elliptical motion of the file during its reciprocating operation in which the elliptical motion is exaggerated in size for clarity.

Thus, during use the hinged bracket 42 rotates between the positions illustrated in FIGS. 9 and 10 during each forward and reverse stroke of the file. The user applies downward pressure from the working end of the file against the workpiece W and the forward stroke will cause the file to cut into the workpiece during each forward stroke. During each reverse stroke the adapter bracket kicks back to the position illustrated in FIG. 10, releasing pressure contact between the roller and the file and thereby releasing contact between the file and the workpiece. This back and forth motion of the adapter occurs at a relatively high rate of speed, for example, 2,800 strokes per minute in some power tools. (This angular back and forth motion is also exaggerated in the drawings.) This operation of the adapter causes the working end of the file to travel through an elliptical path shown at 74 in FIG. 10 during each cycle of its reciprocating travel; and as mentioned, releasing pressure contact during each reverse stroke of the file prevents wear on the teeth of the file by avoiding the file dragging back across the workpiece during each reverse stroke.

FIGS. 11 through 15 illustrate a safety feature of the invention which prevents the file from being ejected from the adapter in the event the file is dislodged from its connection to the chuck. As mentioned, the file reciprocates at high speeds and at high force. In the event the file becomes detached during use, either by the file-to-chuck coupling breaking or being improperly coupled to the chuck, the safety feature retains the file within the adapter to prevent the file from being forcefully ejected.

Referring to FIGS. 11 to 15, all elements of the illustrated embodiment which are common to the embodiment of FIGS. 6 through 10 are shown with the same reference numerals but with prime notation.

Figure 11:
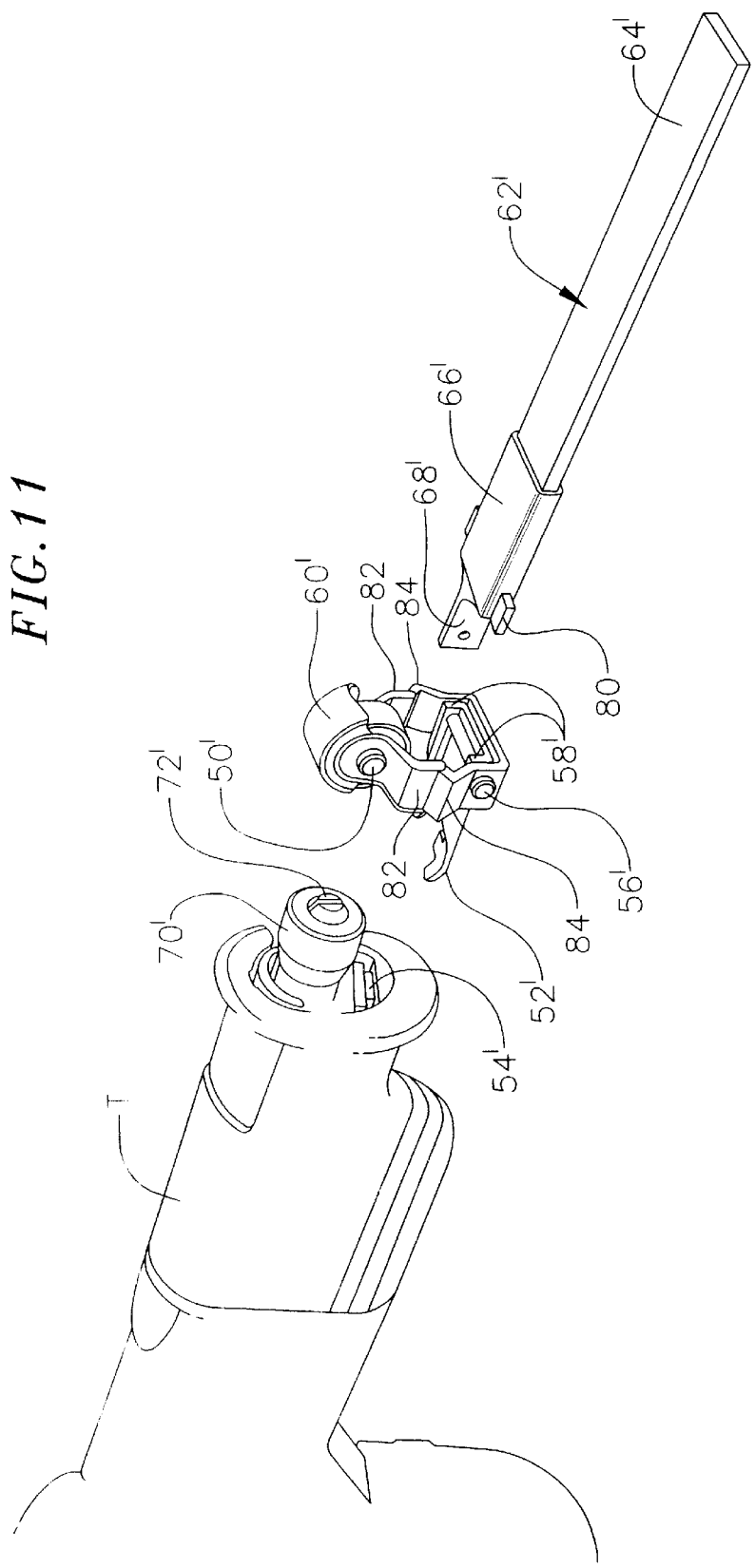
FIG. 11 is a fragmentary exploded perspective view similar to FIG. 5 but showing an alternative embodiment of the file adapter and a modified file for providing a safety feature.
Figure 12:
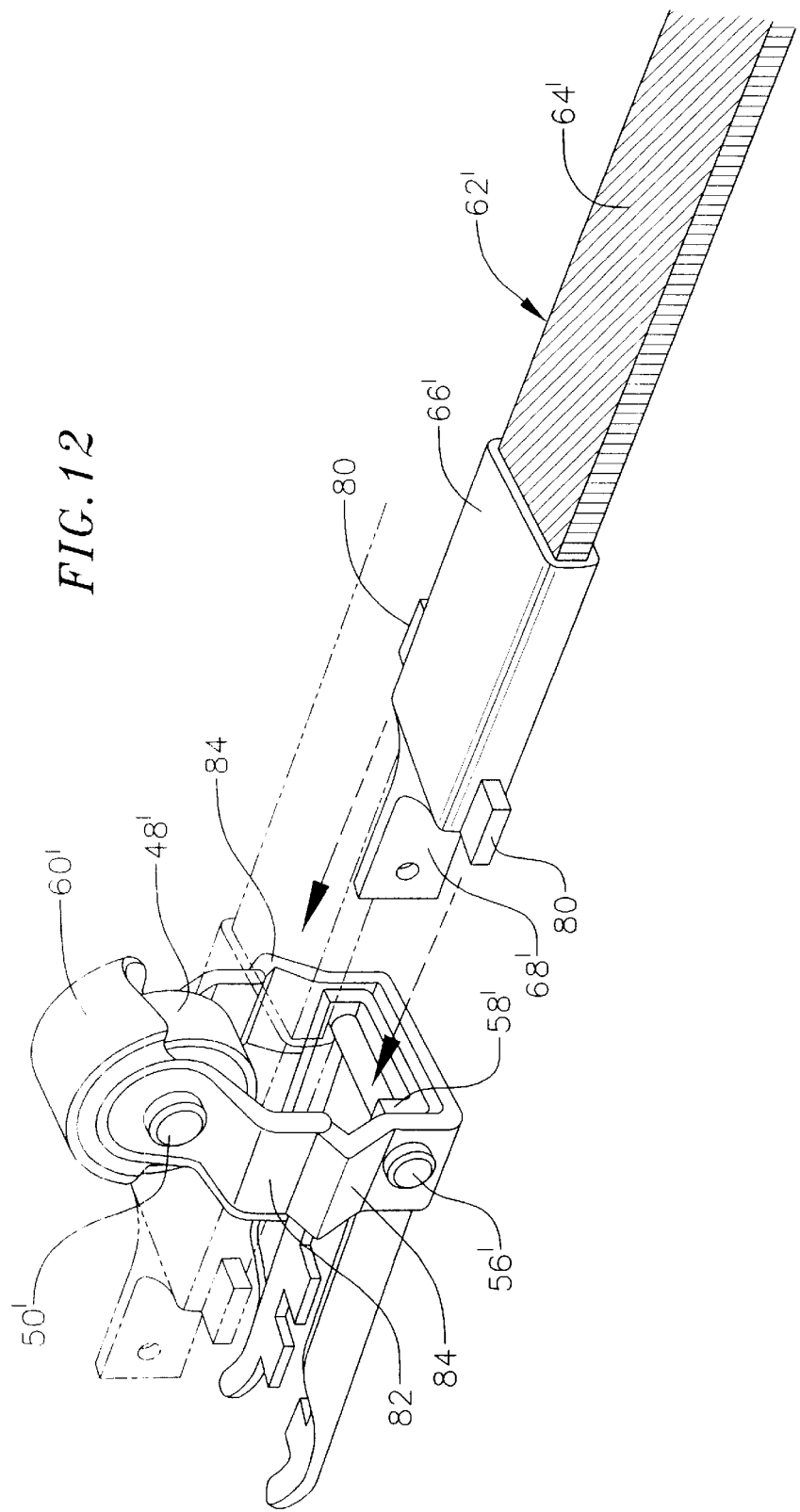
FIG. 12 is a fragmentary exploded perspective view illustrating alignment of the modified file of FIG. 10 and a further embodiment of the file adapter.

The safety feature provided by the invention includes stops 80 in the form of outwardly projecting ears projecting from opposite side walls of the sleeve 66. Preferably the stops are formed integrally with the plastic sleeve. The adapter is configured to allow passage of the stops through the bracket when connecting the file to the chuck. The modified bracket has a flat base above which the opposite side arms extend, but the arms 82 at opposite sides of the bracket are expanded in width at outwardly projecting regions 84 formed at the same elevation at the sides of the bracket. The widened regions are aligned on a fixed horizontal axis spaced below the axis of the clamps contained in the chuck. In this way the file can be inserted through the bracket by passing the outwardly projecting stops through the corresponding widened regions of the bracket. Once the stops pass through the bracket, the end of the file then can be raised to a level at which the flanged end of the bracket can be coupled to the chuck. FIG. 11 shows alignment of the stops with the modified adapter, and FIG. 12 illustrates the level at which the stops pass through the widened portions of the bracket when inserting the end of the file through the adapter. FIG. 13 illustrates the end of the file connected to the chuck where the file has been raised to the level of the chuck for attachment after the stops have passed through the widened portions of the bracket. FIG. 14 is a semi-schematic side elevational view showing alignment of the stops 80 with the widened portion of the bracket prior to inserting the flanged mounting plate of the file through the bracket. FIG. 15 is a semi-schematic side elevational view showing the file in its operative position after the stops have been passed through the adapter bracket and the adapter has been connected to the chuck.

With the file in the operative position shown in FIGS. 13 and 15, the invention provides a safety feature which prevents the file from being ejected from the adapter in the event the file is dislodged from this connection to the chuck. The stops 80 on the end of the file project beyond the narrowed side arm portions of the bracket when the file is in its operative position. If the file becomes dislodged and is ejected in a forward direction, the stops will engage the arms of the bracket at their narrowed spacing above the expanded regions 84 and thereby retain the file within the bracket.

I claim:

1. A file for coupled engagement to a ram-rod of a motor driven workpiece cutting tool with a power head reciprocating said ram-rod on a forwardly projecting axis, the file including: an elongate body with top and bottom faces with cutting means at least on said bottom face and having a vertically disposed mounting plate perpendicular to its top and bottom faces, the cutting means spaced from the mounting plate, the fastening means opening through the mounting plate for receiving a coupling fastener to the ram rod, and stops projecting from opposite sides of the file adjacent the mounting plate for use in retaining the file inside an adapter bracket coupled to the cutting tool for applying a resistance force to the file forward of its engagement to the ram-rod and behind the cutting means for converting the file into a second class lever.

2. The file for a workpiece cutting tool as set forth in claim 1, wherein the fastening means is a shear pin.

3. The file for a workpiece cutting tool as set forth in claim 1, wherein the elongate body of the file has an axis adapted to be disposed coincidental with said projecting axis of the ram-rod, the mounting plate being centered on said axis.

4. The file for a workpiece cutting tool as set forth in claim 1, the workpiece cutting tool having a low friction sleeve extending along at least an upper face of the file adjacent the mounting plate.

5. A file adapter for a motor driven workpiece cutting tool with a power head reciprocating an elongate file coupled to a ram-rod reciprocated thereby on a forwardly projecting axis, the file having top and bottom faces with cutting means on said bottom face spaced from the ram-rod, the file adapter including:

a forwardly extending member carried by the power head of the tool and positioning a resistance means for engaging and downwardly pressing on the top face of the file forwardly of its coupled engagement to the ram-rod and behind the cutting means, when the ram-rod causes the file to travel on a forward stroke along said axis, the file being a second class lever with its fulcrum coupled to the ram-rod and its resistance pressured at said resistance means when its cutting means forcibly engage a workpiece forward of the resistance means, the file adapter causing the resistance means to release downward pressure on the face of the file when the ram-rod causes the file to travel in a reverse direction, wherein the file adapter includes a shoe for fixed attachment to the cutting tool, a bracket pivotally secured to a remote end of the shoe spaced from its attachment to the cutting tool, a pivot between the bracket and shoe, the resistance means coupled to the bracket remote from the pivot, wherein the resistance means releases said contact with the file when the bracket pivots the resistance means away from the file on the reverse stroke of the ram-rod.

6. The file adapter for a workpiece cutting tool as set forth in claim 5, wherein the forwardly extending member comprises a bracket and in which the bracket has a widened spacing at a level spaced from an axis through the point of attachment between the file and the chuck, whereby stops projecting from the file can pass through the widened portion of the bracket and be captured by a narrowed portion of the bracket if the file is disengaged from its attachment to the chuck.

7. A motor driven workpiece cutting tool with a power head reciprocating a ram-rod on a forwardly projecting axis, and including:

an elongate file coupled to the ram-rod to be reciprocated thereby, and having top and bottom faces with cutting means at least on said bottom face spaced from the ram-rod, and a file adapter extending forwardly from the power head of the tool and positioning a resistance means for engaging and downwardly pressing the top face of the file forwardly of its coupled engagement to the ram-rod and behind the cutting means, when the ram-rod causes the file to travel forward on said axis, the file adapter causing the resistance means to release downward pressure on the top face of the file when the ram-rod causes the file to travel in a reverse direction, the file being a second class lever with its fulcrum coupled to the ram-rod, its resistance pressing at said resistance means forwardly of the ram-rod and behind said cutting means, when its cutting means forcibly engage a workpiece, the file adapter having a narrowed region aligned generally on said axis and a widened region spaced from said axis, so that a stop device carried on the file can pass through the widened region but engage the narrowed region to retain the file inside the file adapter in the event the file becomes dislodged from the ram-rod during use.

8. A file for coupled engagement to a ram-rod of a motor-driven workpiece cutting tool with a power head reciprocating the ram-rod on a forwardly projecting axis, the file including an elongated body having top and bottom faces with a cutting surface on at least the bottom face, a vertically disposed mounting plate integral with the body and extending generally perpendicularly to the top and bottom faces, the cutting means spaced from the mounting plate, and a fastening adapter opening through the mounting plate for coupling a fastener to the ram-rod, including safety ears projecting outwardly from opposite sides of the file body immediately in front of the mounting plate.

9. Apparatus according to claim 8 in which the ram-rod has a stroke length, and said distance is at least equal to the stroke length of the ram-rod.

* * * * *